(12) United States Patent
Rouvinen

(10) Patent No.: US 9,208,311 B2
(45) Date of Patent: Dec. 8, 2015

(54) DETECTION OF A THREAT IN A COMMUNICATIONS NETWORK

(71) Applicant: Airo Finland Oy, Helsinki (FI)

(72) Inventor: Jarmo Tapio Rouvinen, Helsinki (FI)

(73) Assignee: AIRO FINLAND OY, Helsinki (FI)

( * ) Notice: Subject to any disclaimer, the term of this patent is extended or adjusted under 35 U.S.C. 154(b) by 0 days.

(21) Appl. No.: 14/198,786

(22) Filed: Mar. 6, 2014

(65) Prior Publication Data

US 2014/0259160 A1  Sep. 11, 2014

(30) Foreign Application Priority Data

Mar. 7, 2013 (FI) .................................... 20135215

(51) Int. Cl.
*G06F 21/55* (2013.01)
*H04L 29/06* (2006.01)

(52) U.S. Cl.
CPC .......... *G06F 21/554* (2013.01); *H04L 63/1458* (2013.01)

(58) Field of Classification Search
CPC .............................. H04L 63/00; G06F 21/554
USPC ......................................................... 726/22
See application file for complete search history.

(56) References Cited

U.S. PATENT DOCUMENTS

| | | | |
|---|---|---|---|
| 6,823,387 B1 * | 11/2004 | Srinivas ........................ | 709/227 |
| 7,536,552 B2 * | 5/2009 | Touitou et al. ................. | 713/170 |
| 7,640,338 B2 * | 12/2009 | Huitema et al. .............. | 709/224 |
| 7,640,591 B1 | 12/2009 | Tripathi et al. | |
| 7,979,694 B2 * | 7/2011 | Touitou et al. ................. | 713/154 |
| 8,453,208 B2 * | 5/2013 | Jiang ................................. | 726/3 |
| 2005/0039104 A1 | 2/2005 | Shah et al. | |
| 2005/0216954 A1 | 9/2005 | Ramaiah et al. | |

(Continued)

FOREIGN PATENT DOCUMENTS

| | | |
|---|---|---|
| EP | 2161898 A1 | 3/2010 |
| WO | 0219661 A2 | 3/2002 |
| WO | 2004079497 A2 | 9/2004 |

OTHER PUBLICATIONS

Sardana et al. (Detection and Honeypot Based Redirection to Counter DDoS Attacks in ISP Domain, IEEE 2007, pp. 191-196).*

(Continued)

*Primary Examiner* — Saleh Najjar
*Assistant Examiner* — Oleg Korsak
(74) *Attorney, Agent, or Firm* — Young & Thompson

(57) ABSTRACT

Disclosed is a method for detecting a threat against a host computer coupled to the front-end computer. A communication connection is established between the host computer and a source computer with a handshake procedure through a front-end computer. Application data is received in the front-end computer from the source computer. The received application data is returned from the front-end computer to the source computer. It is monitored in the front-end computer if a predetermined message is received from the source computer in response to the return of the application data. If the predetermined message is received in the front-end computer, it is determined that the source computer is a trusted communication party, But if the predetermined message is not received, the source computer is determined as a threat. The invention relates also to computing device implementing the method and a computer program product.

20 Claims, 3 Drawing Sheets

(56) References Cited

U.S. PATENT DOCUMENTS

2006/0072455 A1    4/2006    Cai et al.
2011/0289559 A1    11/2011    Jacoby et al.

OTHER PUBLICATIONS

Finnish Search Report, dated Nov. 26, 2013, from corresponding FI application.

* cited by examiner

DETECTION OF A THREAT IN A COMMUNICATIONS NETWORK

TECHNICAL FIELD

The invention concerns in general the technical field of security of information systems. Especially the invention concerns defense mechanism against denial of service attack.

BACKGROUND OF THE INVENTION

Communication in today's world is heavily based on communications networks. The development in the area of the communications networks has been tremendous especially during the past decades. However, the more important the communications networks have become the more attractive targets they are for criminals. One more and more common abuse in the communications network is so called denial of service attack (DoS). The denial of service attack is an attempt to prevent or to impair a legitimate use of a service in the communications network. Typically, the services are implemented in a manner that there is a so called host computer coupled to the communications network. The host computer is configured to maintain and host, i.e. provide, the service to the public, or limited number of people. Now, the criminals may, by arranging an attack against the host computer, prevent or at least impair the availability of a legitimate service. The host computer in this context shall be understood to cover a personal computer, a router, a server or a network or the like.

A typical way to arrange the attack against the host computer is to launch the attack from a device or system coupled to the Internet towards to the host computer. The denial of service attack comprises several sub-types but one common method of attack involves saturating the host computer with external communication requests. As a result, the host computer cannot respond to legitimate traffic, or responds so slowly, that the service can, in practice, be considered as being unavailable.

Naturally, there have been developed several ways to defend against DoS attacks. The defense can e.g. be based on so called firewall solutions, switch or router solutions, application front end hardware solutions or IPS (Intrusion-prevention systems) based prevention among others. The firewall solutions are typically based on an idea to allow or deny traffic under predetermined conditions, such as based on protocols, ports or IP addresses. The switch and router solutions are normally based on rate limiting solutions, wherein the traffic activity is monitored and based on that e.g. filtering to the data traffic can be made. Further, the application front end hardware solutions are based on an idea that some intelligent hardware is placed on the network before traffic reaches the host computers. The application front end hardware is configured to analyze data packets as they enter the system and to filter them accordingly. IPS based prevention, in turn, is based on an idea of utilizing signatures for recognizing the content.

The most common set of communication protocols used in Internet and similar networks is co called Internet protocol suite. It is commonly referred as TCP/IP (Transmission Control Protocol/Internet Protocol), because of its most important protocols TCP and IP. The Internet protocol suite provides end-to-end connectivity and it describes how data shall be formatted, addressed, transmitted, routed and received at the destination. The Internet protocol suite uses so called encapsulation to provide abstraction of protocols and services. The encapsulation is achieved by arranging different layers for different purposes in the Internet protocol suite. The layers are application layer, transport layer, network layer and link layer. The scope of the application layer is to enable communication of user data created by the applications to other processes or applications. The application layer is also referred by process-to-process communication. The transport layer is dedicated to host-to-host communication, which refers to end-to-end message transfer independently of the underlying network, along with error control, segmentation, flow control, congestion control and application addressing. The end-to-end message transmission or connecting applications at the transport layer can be categorized as either connection-oriented, implemented in TCP, or connectionless, implemented in UDP (User Datagram Protocol). The network layer, in turn, has the responsibility of sending data packets across potentially multiple networks. The internetworking requires sending data from the source network to the destination network, which is also known as routing. In the Internet protocol suite the Internet protocol performs two basic functions for the routing i.e. host addressing and identification and packet routing. The link layer is the networking scope of the local network connection to which a host is attached. The link layer is used to move data packets between the Internet layer interfaces of two different hosts on the same link.

As already mentioned the Internet protocol suite is based on the concept of encapsulation. This means that each layer in the protocol stack adds information to the data with header information. Thus, the user data is encapsulated to application data 107 into which a TCP header 105 is added, next the IP header 103 is added and finally Ethernet headers 101. The structure is illustrated in the FIG. 1. The structure does not illustrate any trailer information, such as Ethernet trailer at the end of the message structure. FIG. 1 illustrates the packet structure in case of TCP/IP, but a similar structure can also be drawn for UDP.

In FIG. 2 it is illustrated prior art solution against DoS attack by means of firewall. The FIG. 2 illustrates the following elements: host computer 201, front-end computer 203 performing firewall operations, Internet 205 and source computer (attacker) 207. For clarity reasons only one source computer is illustrated, but the number of source computers may vary and typically the DoS attacks are originating from multiple source computers 207 in order to achieve the destructive effect. The source computer 207 sends DoS data in a protocol structure complying the TCP/IP encapsulation. The DoS data is encapsulated in the application data 107 field. Now, as the state of the art DoS firewall solutions are configured to examine for example the protocol structure or IP address, the firewall does not detect that the application data contains DoS data, since the data packet seems to comply all requirements in the TCP/IP communication. Thus, the denial of service attack cannot be prevented with the prior art solutions.

A further aspect with respect to TCP protocol is the way of operation of it. The first communication from a source starts with so called TCP SYN packet, which comprises the address of the sender and the destination address of the recipient. The first communication reaches the front-end computer, which maintains firewall operations. The firewall is configured to read the destination address of the data packet from the received communication and on a basis of that to initiate the communication connection to the destination address, i.e. to the host computer, with TCP SYN frame. The host computer responds to the firewall with TCP ACK SYN frame with its own address and the destination address, i.e. firewall address. The firewall acknowledges this back to the host computer with TCP ACK frame. As a result, the communication connection is established between the host computer and the firewall.

The firewall is also configured to respond to the source computer with a TCP ACK SYN frame with at least the recipient's address as well as the its own address when the firewall is implemented in a typical way. The own address is a so called NAT-IP address (Network Address Translation).

The source computer acknowledges with TCP ACK packet to the firewall. As a result, the communication connection is established between the firewall and the source computer.

Further, the ACK packets, i.e. TCP ACK SYN and TCP ACK, as described above comprise ACK counter information, which carries information how much each of the party of the communication connection has received application data in bytes. The start value for the ACK counters of each party is defined in the TCP SYN and TCP ACK SYN frames. In addition, the status of the amount of the received application data for each of the parties is maintained in the counters. The counter information representing the total amount of data sent by the party is maintained in a Sequence Number field in the TCP frame.

After the above described handshake procedure the communication can be started in both communication connections through the firewall, which monitors and maintains the connection between the source computer and the host computer. In the worst case, the DoS data may reach the target through the communication connection, as the firewall only has checked that the protocols and their frame structures are correct.

It would be advantageous to find more sophisticated solutions in order to defend against a denial of service attack the most effective manner.

SUMMARY OF THE INVENTION

An objective of the invention is to present a method, a computing device and a computer program product for detecting a threat in a communications network. Another objective of the invention is that the method and the computing device and the computer program product for detecting a threat enable communications between the parties in the communication so that the threat can be detected.

The objects of the invention are reached by a method, a computing device and a computer program product as defined by the respective independent claims.

According to a first aspect, a method for detecting, in a front-end computer, a threat against a host computer coupled to the front-end computer is provided. The method comprises a step of establishing a communication connection between the host computer and a source computer with a handshake procedure through a front-end computer, a step of receiving, in the front-end computer, application data in a data packet from the source computer in response to a successful handshake procedure, the received data is intended to the host computer, a step of acknowledging the receipt of the data packet by the front-end computer, a step of returning the received application data from the front-end computer to the source computer, a step of monitoring, in the front-end computer, if a predetermined message is received from the source computer in response to the return of the received application data to the source computer, and if the predetermined message from the source computer is received in the front-end computer, determining the source computer as a trusted communication party, if the predetermined message from the source computer is not received in the front-end computer, determining the source computer as a threat.

The predetermined message may be an acknowledgement message or a reset message.

According to the method the predetermined message from the source computer may be waited for a predetermined period of time. The predetermined period of time may be defined by as a sum of at least a latency of the communication channel and a time needed for processing of the returned application data in the source computer.

At least one of the following may further be taken into account in defining the predetermined period of time: delay set in a TCP frame, additional time margin.

The monitoring may further comprise a step of determining if the predetermined message indicates that a value of a counter representing an amount of data received in the source computer is added with a value corresponding the amount of data delivered from the front-end computer to the source computer.

Further, the method may comprise a step of initiating a cut-off the communication connection in response to a determination of the source computer as a threat.

The method may further comprise a step of re-addressing data flow from the source computer if the predetermined message from the source computer is not received in the front-end computer, The data flow may be re-addressed to at least one of the following: to the source computer, an isolated computing environment.

According to a second aspect, a computing device for detecting a threat against a host computer coupled to the computing device is provided. The computing device comprises at least one processor and at least one memory including computer program code. The computing device is caused to perform, by executing at least portion of the computer program code with the at least one processor, at least the following: establish a communication connection to the host computer and to a source computer with a handshake procedure, receive application data in a data packet from the source computer in response to a successful handshake procedure, the received data is intended to the host computer, acknowledge the receipt of the data packet to the source computer, return the received application data to the source computer, monitor if a predetermined message is received from the source computer in response to the return of the received application data to the source computer, and determine the source computer as a trusted communication party if the predetermined message from the source computer is received, determine the source computer as a threat if the predetermined message is not received.

The computing device may be configured to wait the acknowledgment for a predetermined period of time.

The computing device may further be configured to initiate a cut-off the communication connection in response to a determination of the source computer as a threat.

The computing device may further be configured to re-address the received data flow to at least one of the following: to the source computer, an isolated computing environment.

According to a third aspect, a computer program product, comprising portions of computer program code configured to perform any methods as described above is provided, when at least some portion of the computer program code executed in a computing device.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION AND ITS ADVANTAGEOUS EMBODIMENTS

The aspects of the invention relate to procedures by means of which it is at least partly possible to protect a host computer against a threat, such as a denial of service attack. The denial of service attack is possibly originated from one or more source computers connected to a communications network. Especially, the invention may be implemented as part of a firewall solution, the computer performing the inventive operations i.e. a front-end computer may be a separate entity from the firewall solution. The front-end computer is configured to perform, at least, operations to detect a threat, and optionally to protect the host computer against illegal communication activities from the network. The terms host computer, front-end computer and the source computer shall be understood broadly to cover a personal computer, a router, a server, a network or the like.

Figure 1:
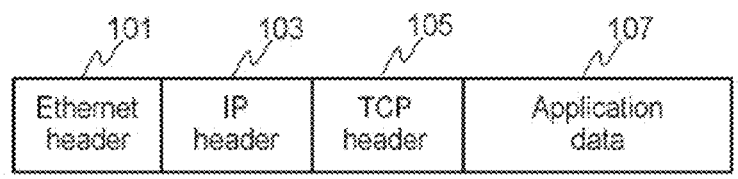
FIG. 1 illustrates a TCP packet structure.
Figure 2:
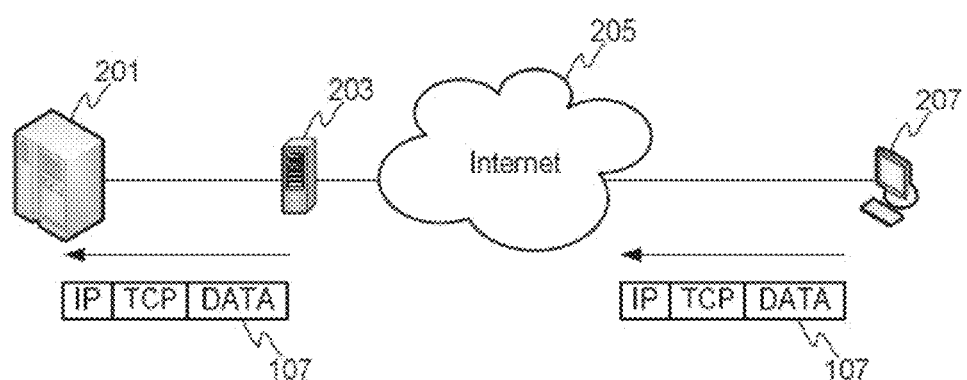
FIG. 2 illustrates an example of a prior art solution against DoS attack.
Figure 3:
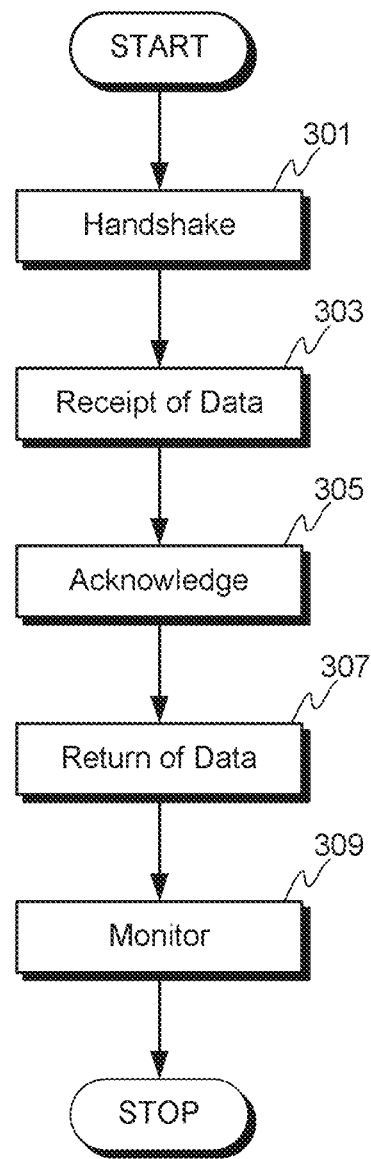
FIG. 3 illustrates an example of a method according to the invention.

An example of the invention is now described by referring to FIG. 3. FIG. 3 discloses at least some of the method steps according to the example of the invention in a context of a communication connection between a host computer 201 and a source computer 207 through Internet 205. For sake of clarity, the example of the invention is here described in a context of firewall. A firewall solution is arranged in a front-end computer for at least monitoring the traffic in the communication connection between the host computer 201 and the source computer 207, which is established as a handshake procedure over the front-end computer. TCP connection in this context means a communication connection in which both IP and TCP protocols are utilized and application data is carried over the mentioned protocol between the parties of the communication. As the advantageous features of the invention are achieved with the TCP protocol it is not referred to any other protocol or protocol layer when describing the invention. As said, the method according to the invention comprises a step in which a communication connection is established in which TCP protocol is involved. The establishment of the communication connection comprises a handshake procedure 301 between the parties of the communication connection over the front end computer 203. The handshake procedure is performed between the source computer 207 and the front-end computer 203 and between the host computer 201 and the front-end computer 203. Thus, there are two separate communication connections when the communication channel is established between the source computer 207 and the host computer 201. If the handshake procedures 301 are successful, i.e. the mentioned steps are performed, the communication channels are established and the communication between the parties of the communication can be initiated. If the handshake procedure is not successful, the communication connection is not established.

In response to a successful handshake procedure the source computer 207 may initiate a delivery of application data, which may be denial of service data. The delivered application data is received in the front-end computer 203, which receipt is arranged to be acknowledged with a TCP ACK frame by the front-end computer 203. The acknowledgement 305 may also comprise information on the amount of data received in the front-end computer 203. The information may be indicated to the source computer 207 by increasing the start value of the counter dedicated to the front-end computer 203 with a value corresponding to the amount of data received in the host computer 201.

According to an example of the invention the front-end computer 203 is also configured to return 307 the received application data, if any, to the source computer 207 in a data packet. In practice, this means that when the front-end computer 203 receives the application data in a message, the front-end computer 203 is configured to determine the application data in the message, retrieve it from the message and input it to a new data packet. The data packet is sent from the front-end computer 203 to the source computer 207 over the established communication connection, wherein the data packet complies with the protocols used in the communication connection. In some attack types the source computer does not deliver any application data to the front-end computer 203. In such a case the front-end computer is configured to create and input some random data to the data packet and send it back to the source computer 207 accordingly.

According to an example of the invention the front-end computer 203 is arranged to monitor 309, in response to the delivery of the data packet comprising the application data, if the source computer 207 responses a receipt of the message in a predetermined manner i.e. with a predetermined message.

According to an example of the invention the predetermined message may be an acknowledgement according to an operation of a protocol, which is used in the communication connection. For example, it is possible to monitor if a TCP ACK message is received from the source computer 207 e.g. in a predetermined period of time i.e. in other words the front-end computer is configured to wait the acknowledgement for the predetermined period of time. If the acknowledgement TCP ACK is received, according to an example of the invention it may be enough to judge that the source computer 207 is a trusted party for communication.

The predetermined period of time may be at least partly dependent on one or more parameters relating to the transmission channel and/or processing capabilities of the source and/or target computers and/or any other parameter. In other words, the predetermined period of time may consist of the delay in the transmission channel i.e. on the latency and on a processing time in the source computer 207. Additionally a delay for an acknowledgement if set in the TCP frame may be taken into account. The predetermined period of time may thus be defined as a sum of at least some of the mentioned factors. In minimum the predetermined period of time is a sum of the latency and the processing time of the source computer. Some additional margin may be added to so defined period of time in order to provide more delay to prevent any misoperation in the monitoring. The total predetermined period of time may also be determined in some other manner, which provides optimal operation of the monitoring. A general aspect is that TCP protocol is so defined that the acknowledgement is configured to be given as soon as possible in response to the receipt of the data packet, unless a delayed acknowledgement is set.

In addition to the simple monitoring of the receipt of acknowledgement some further aspects may be added to the monitoring, such as to monitor if the acknowledgement indicates that the value of a counter representing an amount of data received in the source computer 207 is added with a value corresponding the amount of data delivered from the front-end computer 203 to the source computer 207, as shall be the case. If the information in the acknowledgement matches as was set for the monitoring, it can be concluded by the front-end computer 203 that the source computer 207 is a trusted party for the communication i.e. it is not sending any denial of service data. The counter may e.g. be TCP SEQ counter, the value of which is given in the Sequence Number field in the TCP frame.

Another aspect relating to the invention is that the application software in the source computer 207 is configured to reset the connection in response to a receipt of application data from the front-end computer 203. The reason for such an operation is that when trusted application software running in the source computer 207 receives unexpected data, it is configured to reset the connection by sending TCP Reset (RST) frame, or TCP Finish (FIN) frame in some other implementation of TCP protocol stack, to the front-end computer 203. Additionally, the delivery of the application data from the source computer 207 is terminated. Next, the communication connection is established again with TCP SYN frame sent by the source computer 207 and the communication between the trusted parties can be reinitiated without any user intervention.

Thus, according to some aspect of the invention receipt of the TCP RST, or TCP FIN, frame in the front-end computer 203 from the source computer 207 may be utilized in judging if the source computer 207 is a trusted party for communication. In other words, the TCP RST, or TCP FIN, message may be considered as a predetermined message for making the judgment. This is preferable solution especially due to the fact that some illegal application software running in the source computer 207, which is performing an attack against the front-end computer 203, may send the TCP ACK message as required, but does not send the reset of the communication connection as required according to the protocol. In order to detect an attack it may be beneficial to set the triggering to the receipt of TCP RST, or TCP FIN, message. The TCP RST, or TCP FIN, message is configured to wait a predetermined period of time in order to make the judgment if the communication party is trusted or not. The predetermined period of time for the TCP RST, or TCP FIN, message may be defined similarly as described in the context of TCP ACK message above.

On the contrary, if no message with a predetermined message is received from the source computer 207, the front-end computer 203 is configured to determine that the source computer 207 is a threat as a communication party. This determination may cause the front-end computer 203 to initiate a cut-off the communication connection between the host computer 201 and the source computer 207. The cut-off may be arranged in such a manner that the front-end computer 203 delivers TCP FIN frame to both parties of the communication, i.e. to the host computer 201 and the source computer 207. TCP FIN frame is used to cut off the TCP connection. Furthermore, the front-end computer may be configured, e.g. immediately in response to the determination of a threat, to prohibit any traffic into any direction. As described above the predetermined message used in the determination of the source computer 207 as a communication party may be TCP ACK message or TCP RST or TCP FIN message. According to still further example of the invention the source computer 207 may continue establishment of connection and delivery of data to the destination computer i.e. host computer 201 even if the front-end computer 203 has initiated the cut-off the communication connection. In such a case any data received from the source, or to be received, may be directly directed into a predetermined virtual local area network (VLAN) in order to isolate the data from the destination computers. Alternatively or in addition, the front-end computer 203 may be arranged to continue the operation, i.e. returning the received data, towards the source computer 207.

A special case may be that the source computer 207 is sending TCP SYN frames without any application data. In such a case the front-end computer 203 is configured to create and input some random data to the data packet and return it to the source computer 207, and monitor the behavior of the source computer 207 in a manner described above.

In a case that the source computer 207 acknowledges the receipt of data, but with a value of the counter, which does not correspond to the amount of data sent to the source computer 207, the front-end computer 203 is configured to determine that the source computer 207 is a threat. Alternatively, as there is a queue of TCP packets between the source computer 207 and the front-end computer 203 and as the counters values goes according to packet by packet, the acknowledgement and the counter value need to be delivered and received in the pre-defined order. Thus, if an acknowledgement is missing, it is also configured to trigger the interpretation that the source computer is a threat. An exception to this is a TCP SACK (sequenced acknowledgment), which provides means for transferring and acknowledging a missed data block, The utilization of this may be set in the method according to the invention if desired.

The background of the invention is the standardized operation of the TCP/IP protocol in the communication. During the handshake procedure the port numbers of each of the communication parties are exchanged by means of which an access to OSI layer 7 is enabled. OSI layer 7 is the application layer on which e.g. the telecommunications applications, such as Telnet, SMB, FTP and HTTP, are running. For this reason as trusted application software, when receiving unexpected data, is configured to send TCP RST frame, because there is access to layer 7. A trusted communication party established the connection immediately. On the contrary, a party being a threat does not send TCP RST message, because the attacking application software is not configured to listen its own port. As the background, it is also important to remember that usually the source computers being attackers are normal network computers, which are hijacked into illegal use. Thus, they comprise the standardized TCP/IP stack and they are operating accordingly, and they may give a required response to a receipt of data i.e. TCK ACK message.

As the front-end computer operates as a middleware between the target and the source it is possible to arrange further procedures to be performed by the front-end computer. Namely, the front-end computer may be configured to manipulate the at least one data packet from the source computer. The manipulation may comprise, for example, procedures by means of which the source computer, and possible any persons behind it, may be identified. Alternatively or in addition, the front-end computer may be configured to re-address the data flow from the source computer. The poisoned data may be re-addressed to an isolated computing environment, such as by the Layer2 VLAN TAG to a virtual data garbage, or it may even be redirected back to the source computer and thus attacking against the source computer. It may also be arranged that a message is sent to the source computer indicating that the intention of the source computer is determined and blocked, and the information on the source computer will be given to authorities for further actions. The isolated computing environment as mentioned above may refer to a computing device, network or similar by means of which the poisoned data may be isolated from the communications network in a manner that it can be analyzed and any damage in the communications network can be prevented.

The suspected denial of service data may be analyzed in the virtual data garbage. The term data garbage shall be understood as a computing device or a virtual local area network dedicated to store and analyze the data switched (L2) or routed (L3) there. Advantageously, any means to output data from the data garbage is prevented, at least as long as any threat with respect to the data is removed.

In some implementation, the virtual data garbage may be the virtual local area network (VLAN) of an authority.

Figure 4:
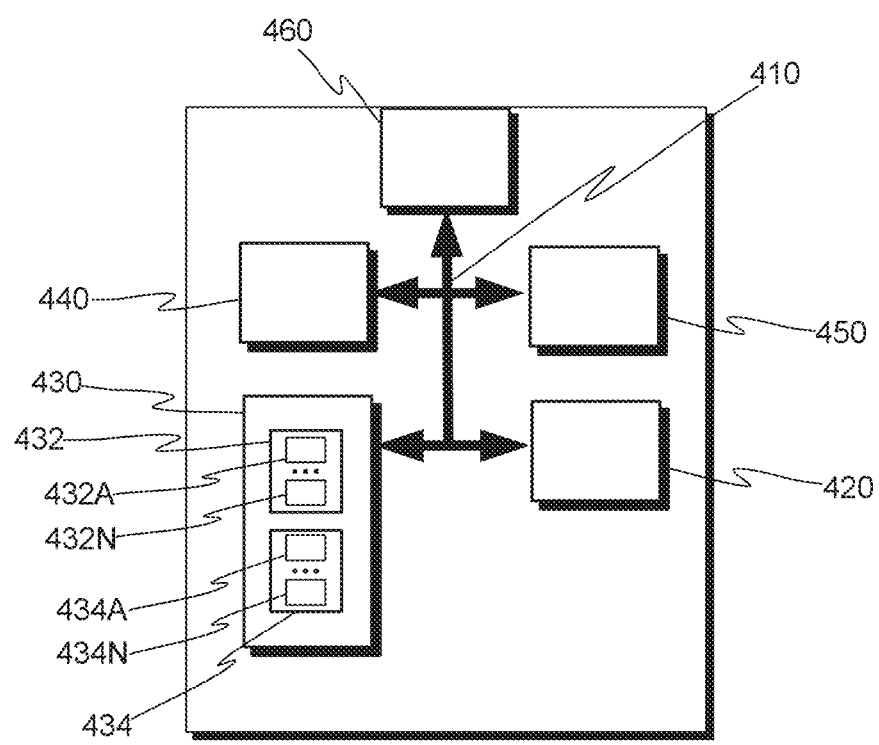
FIG. 4 illustrates an example of a computing device according to the invention.

The invention also relates to a computing unit, which is configured to implement the method as described above and which thus operates as a front-end computer in a sense as described. A computing unit according to an example of the invention is illustrated in FIG. 4. The computing device 400 comprises, for example, a bus 410, a processor 420, a memory 430, input means 440, output means 450, and a communication interface 460. The bus 410 may include means or methods that enable communication among the elements of the computing device 400. The computing device may comprise, or be implemented by, one or more servers, one or more desktop computers or one or more special hardware devices as long as it is capable of implementing the method according to the invention. Thus, in principle any computing device, which comprises necessary hardware and computer program code stored in a memory, may be configured to implement the method as described.

The processor 420 may comprise one or more conventional processors, one or more microprocessors, or one or more processing logics, or any combination of these, that interprets and executes instructions defined by portions of computer program code. The memory 430 may comprise a random access memory (RAM) 432 and/or a read only memory (ROM) 434. The RAM 432 may store information and instructions in a form of portions of computer program code 432A-432N for execution by the processor 420. The ROM 434 may include a conventional ROM device or another type of a static storage device that is configured to store static information and instructions in a form of portions of computer program code 434A-434N for use by the processor 420. The RAM 432 and ROM 434 may be implemented with one or more corresponding memory elements.

The input means 440 may comprise a conventional mechanism that permits inputting information to the computing device 400, such as a keyboard, a mouse, a pen, a touch screen, voice recognition and/or biometric mechanisms, CD/DVD/Blue-ray drive etc. The output means 450 may comprise a conventional mechanism that outputs information, including a display, a printer, a speaker, etc. The input and output means are not necessarily implemented into the computing device 400, but may be coupled to the computing device 400 with some known interfaces either wirelessly or in a wired manner when needed. In some examples of the invention the computing device does not comprise any input means 440 or output means 450 as the computing device operates as a standalone entity, which is controlled externally through the communication interface 460.

The communication interface 460 may enable the computing device 400 to communicate with other elements and/or systems, such as networks, as well as with client terminals either directly or indirectly over a network.

The computing device 400 may perform the operations as described above in response to the processor 420 executing at least one instruction defined in portions of computer program code contained in the computer-readable medium, such as memory. A computer-readable medium may be defined as a physical or logical memory device. The software instructions may be read into the memory from another computer-readable medium, such as a data storage device, or from another device via the communication interface 460. The software instructions may cause the processor 420 to perform method steps and processes as described and thus to enable the operation of the computing device 400 according to an example of the invention.

As said, FIG. 4 illustrates an example of the computing device 400 according to the invention. The elements as disclosed in FIG. 4 do not necessarily exist in all implementations of the computing device 400. For example, the computing device 400 may not comprise input means 440 and output means 450, but the computing device 400 may be accessed through the communication interface 460 with applicable devices and systems. As well, the number and type of memories may vary. Further, the amount of portions of computer program code may depend on the implementation.

The computing device 400 is configured, by means of at least part of the mentioned elements, to implement the method according to an example of the invention. Some aspects of the invention relate to a computer program product, which comprises portions of computer program code. At least some portion of the computer program product is configured to be executed in a computing device and thus performing any methods and/or method steps as disclosed in the context of describing the method according to examples of the invention.

In the description above it is described that the application data received in the front-end computer 203 from the source computer 207 is configured to be returned to the source computer 207 in full, or if there is no application data in the message, some random data is returned. According to some example of the invention the front-end computer 203 is configured to, in response to an established connection, return a predetermined amount of data, either application data or random data, to the source computer 207 in all messages delivered from the front-end computer 203 to the source computer 207 and monitoring the behavior of the source computer 207 according to the present invention in response to the delivery. Alternatively or in addition, the application data, or any random data, may be delivered only in some specific occasions during the communication, such as always when the communication connection is established.

Some advantageous embodiments according to the invention were described above. The invention is not limited to the embodiments described. The inventive idea can be applied in numerous ways within the scope defined by the claims attached hereto.

The invention claimed is:

1. A method for detecting, in a front-end computer, a threat against a host computer coupled to the front-end computer, the method comprising the front-end computer:

establishing a communication connection between the host computer and a source computer with a handshake procedure through a front-end computer, receiving, in the front-end computer, application data in a data packet from the source computer in response to a successful handshake procedure, the received data is intended to the host computer, acknowledging the receipt of the data packet by the front-end computer, returning the received application data from the front-end computer to the source computer, the received application data being extracted from the received data packet and returned in a new data packet, to the source computer, monitoring, in the front-end computer, when a predetermined message is received from the source computer in response to the return of the received application data to the source computer, and when the predetermined message from the source computer is received in the front-end computer, determining the source computer as a trusted communication party, when the predetermined message from the source computer is not received in the front-end computer, determining the source computer as a threat.

2. A method according to claim 1, wherein the predetermined message is an acknowledgement message or a reset message.

3. A method according to claim 1, wherein the predetermined message from the source computer is waited for a predetermined period of time.

4. A method according to claim 3, wherein the predetermined period of time is defined by as a sum of at least a latency of the communication channel and a time needed for processing of the returned application data in the source computer.

5. A method according to claim 4, wherein at least one of the following is further taken into account in defining the predetermined period of time: delay set in a TCP frame, additional time margin.

6. A method according to claim 1, the monitoring further comprising a step of determining when the predetermined message indicates that a value of a counter representing an amount of data received in the source computer is added with a value corresponding the amount of data delivered from the front-end computer to the source computer.

7. A method according to claim 1, the method further comprising a step of initiating a cut-off the communication connection in response to a determination of the source computer as a threat.

8. A method according to claim 1, the method further comprising a step of re-addressing data flow from the source computer when the predetermined message from the source computer is not received in the front-end computer.

9. A method according to claim 8, wherein the data flow is re-addressed to at least one of the following:
to the source computer, an isolated computing environment.

10. The method of claim 1, wherein,
said step of establishing the communication connection between the host computer and the source computer with the handshake procedure through the front-end computer, the handshake procedure is performed i) between the source computer and the front-end computer, and ii) between the host computer and the front-end computer, with a first communication connection between the front-end computer and the source computer, and a separate, second communication connection between the host computer and the front-end computer, and in said receiving and returning steps, the front-end computer receives the application data in a message, the front-end computer determines the application data in the message, retrieves the application data from the message, inputs the application data, unaltered, to the new data packet, and sends the new data packet to the source computer over the established first communication connection between the front-end computer and the source computer, wherein the new data packet complies with the protocols used in the communication connection.

11. A computing device for detecting a threat against a host computer coupled to the computing device, the computing device comprising
at least one processor
at least one memory including computer program code
wherein by executing at least portion of the computer program code with the at least one processor the computing device is caused to perform:
establish a communication connection to the host computer and to a source computer with a handshake procedure,
receive application data in a data packet from the source computer in response to a successful handshake procedure, the received data is intended to the host computer,
acknowledge the receipt of the data packet to the source computer,
return the received application data to the source computer, the received application data being extracted from the received data packet and returned in a new data packet, to the source computer,
monitor when a predetermined message is received from the source computer in response to the return of the received application data to the source computer, and
determine the source computer as a trusted communication party when the predetermined message from the source computer is received,
determine the source computer as a threat when the predetermined message is not received.

12. A computing device according to claim 11, wherein the computing device is configured to wait the acknowledgment for a predetermined period of time.

13. A computing device according to claim 11, wherein the computing device is further configured to initiate a cut-off the communication connection in response to a determination of the source computer as a threat.

14. A computing device according to claim 11, wherein the computing device is further configured to re-address the received data flow to at least one of the following:
to the source computer (207), an isolated computing environment.

15. The computing devise of claim 11, wherein,
the computing device is caused to perform in the handshake procedure i) between the source computer and the computing device, and ii) between the host computer and the computing device, with a first communication connection between the computing device and the source computer, and a separate, second communication connection between the host computer and the computing device, and in receiving and returning the application data, the computing device receives the application data in a message, the computing device determines the application data in the message, retrieves the application data from the message, inputs the application data, unaltered, to the new data packet, and sends the new data packet to the source computer over the established first communication connection between the computing device and the source computer, wherein the new data packet complies with the protocols used in the communication connection.

16. A non-transitory computer readable medium containing portions of computer program code when executed on a computer causes the computer to perform the method of claim 1.

17. A non-transitory computer readable medium containing portions of computer program code when executed on a computer causes the computer to perform the method of claim 2.

18. A non-transitory computer readable medium containing portions of computer program code when executed on a computer causes the computer to perform the method of claim 3.

19. A non-transitory computer readable medium containing portions of computer program code when executed on a computer causes the computer to perform the method of claim 4.

20. A non-transitory computer readable medium containing portions of computer program code when executed on a computer causes the computer to perform the method of claim 5.

* * * * *